US010525522B2

(12) United States Patent
Yasuda et al.

(10) Patent No.: US 10,525,522 B2
(45) Date of Patent: Jan. 7, 2020

(54) MOLDING DEVICE FOR MANUFACTURING CYLINDRICAL ROLLING BODY, MANUFACTURING METHOD FOR CYLINDRICAL ROLLING BODY, MANUFACTURING METHOD FOR ROLLING BEARING, MANUFACTURING METHOD FOR VEHICLE, AND MANUFACTURING METHOD FOR MECHANICAL APPARATUS

(71) Applicant: NSK LTD., Tokyo (JP)

(72) Inventors: Yuu Yasuda, Kanagawa (JP); Mizuki Watanabe, Kanagawa (JP); Yuuki Mizushima, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/305,410

(22) PCT Filed: Apr. 17, 2018

(86) PCT No.: PCT/JP2018/015885
§ 371 (c)(1),
(2) Date: Nov. 29, 2018

(87) PCT Pub. No.: WO2019/021551
PCT Pub. Date: Jan. 31, 2019

(65) Prior Publication Data
US 2019/0358696 A1    Nov. 28, 2019

(30) Foreign Application Priority Data

Jul. 28, 2017   (JP) ................................. 2017-146076

(51) Int. Cl.
*B21J 5/02*  (2006.01)
*B21J 13/02*  (2006.01)
(Continued)

(52) U.S. Cl.
CPC . *B21J 5/02* (2013.01); *B21J 5/06* (2013.01); *B21J 13/02* (2013.01); *B21J 13/14* (2013.01); *B21K 1/02* (2013.01); *F16C 33/34* (2013.01)

(58) Field of Classification Search
CPC ..... B21J 5/02; B21J 13/02; B21J 13/14; B21J 5/06; F16C 33/34; B21K 1/02
See application file for complete search history.

(56) References Cited

U.S. PATENT DOCUMENTS

| 1,601,252 | A | * | 9/1926 | Lines | ...................... | F16C 33/34 |
| | | | | | | 29/898.068 |
| 8,459,876 | B2 | * | 6/2013 | Weidner | ................ | F16C 19/225 |
| | | | | | | 384/564 |

(Continued)

FOREIGN PATENT DOCUMENTS

| JP | 63-278629 A | 11/1988 |
| JP | 2003-181590 A | 7/2003 |

(Continued)

OTHER PUBLICATIONS

International Search Report and Written Opinion dated Jun. 5, 2018, from International Application No. PCT/JP2018/015885, 7 sheets.

(Continued)

*Primary Examiner* — Ryan J. Walters
*Assistant Examiner* — Lawrence Averick
(74) *Attorney, Agent, or Firm* — Katten Muchin Rosenman LLP

(57) ABSTRACT

With respect to the manufacture of cylindrical rolling bodies, excess material on an outside section in the radial direction and recesses in both end surfaces in the axial direction are not generated as much as possible in the intermediate material that is removed from a molding device for performing compression molding. Annular concave sections 27 are provided on the inner-circumferential surfaces 20a of molding concave sections 19a provided in a station- (Continued)

ary-side mold 17*a* and a movable-side mold 18*a*. The stationary-side mold 17*a* and the movable-side mold 18*a* are brought close to each other in the axial direction while compressing the intermediate material 23 in a state in which both side sections in the axial direction of the intermediate material 23 are inserted into the molding concave sections 19*a*. At this time, a part of the material of the intermediate material 23 is made to enter inside the annular concave sections 27, and undercut sections 32 are formed on the outer side in the radial direction of a compression-molded intermediate material 23*b*. After that, when removing both side sections in the axial direction of the intermediate material 23*b* from the inside of the molding concave sections 19*a* in the axial direction, the undercut sections 32 are drawn through or handled by stepped sections 29 existing at the end sections in the axial direction of the annular concave sections 27.

6 Claims, 11 Drawing Sheets

(51) Int. Cl.
  *F16C 33/34*  (2006.01)
  *B21K 1/02*  (2006.01)
  *B21J 5/06*  (2006.01)
  *B21J 13/14*  (2006.01)

(56) References Cited

U.S. PATENT DOCUMENTS

| | | | | |
|---|---|---|---|---|
| 8,615,885 | B2* | 12/2013 | Besenbeck | B21K 1/02 |
| | | | | 29/898 |
| 8,632,257 | B2* | 1/2014 | Weidner | F16C 19/225 |
| | | | | 384/564 |
| 2006/0013521 | A1* | 1/2006 | Krintzline | B21J 5/02 |
| | | | | 384/568 |
| 2007/0277579 | A1* | 12/2007 | Ruste | B21J 5/02 |
| | | | | 72/355.6 |

FOREIGN PATENT DOCUMENTS

| | | | |
|---|---|---|---|
| JP | 2007-083259 | A | 4/2007 |
| JP | 4225250 | B2 | 2/2009 |
| JP | 4942650 | B2 | 5/2012 |
| JP | 5247873 | B2 | 7/2013 |
| WO | 2006/017260 | A2 | 2/2006 |

OTHER PUBLICATIONS

Decision to Grant a Patent dated Aug. 14, 2018, from Japanese Application No. 2018-535901, 3 sheets.

\* cited by examiner

Prior Art

Prior Art

Prior Art

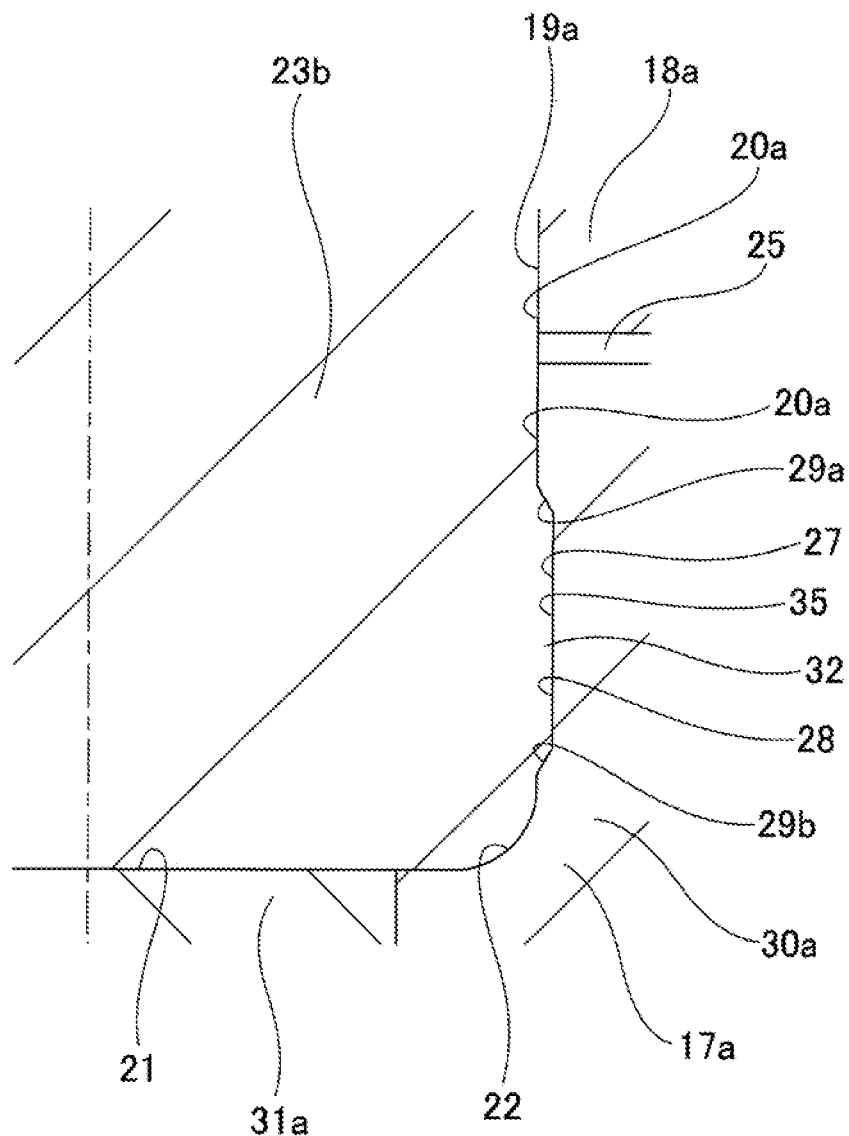

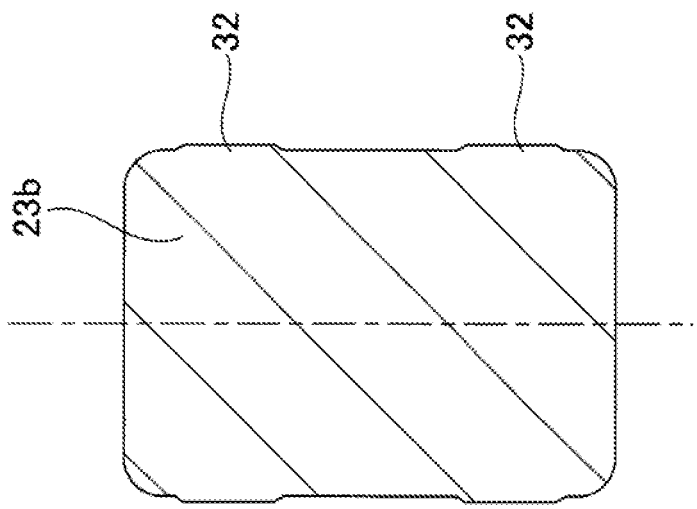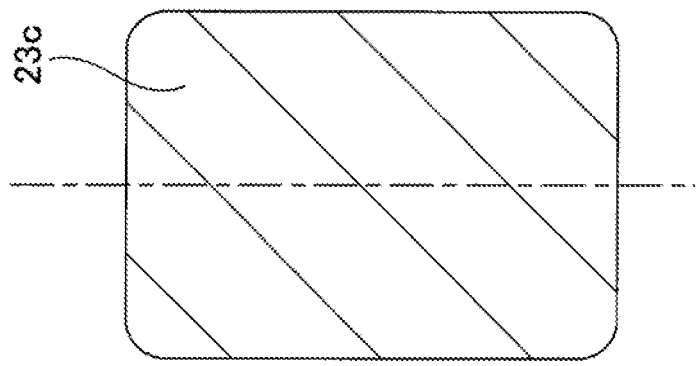

MOLDING DEVICE FOR MANUFACTURING CYLINDRICAL ROLLING BODY, MANUFACTURING METHOD FOR CYLINDRICAL ROLLING BODY, MANUFACTURING METHOD FOR ROLLING BEARING, MANUFACTURING METHOD FOR VEHICLE, AND MANUFACTURING METHOD FOR MECHANICAL APPARATUS

TECHNICAL FIELD

The present invention relates to a molding device for manufacturing a cylindrical rolling body of a rolling bearing to be assembled in a vehicle or a mechanical apparatus, and a method for manufacturing the cylindrical rolling body. Moreover, the present invention also relates to a method of manufacturing a vehicle or a mechanical apparatus in which a rolling bearing having the cylindrical rolling body is assembled.

BACKGROUND ART

Rolling bearings are assembled in vehicles and mechanical apparatuses to support the rotating parts thereof. Examples of rolling bearings include cylindrical roller bearings using cylindrical rollers, and needle roller bearings using needles as rolling bodies.

FIG. 1 illustrates a cylindrical roller bearing 1 as a rolling bearing. The cylindrical roller bearing 1 includes an outer ring 3 having an outer-ring raceway 2 around the inner-circumferential surface thereof, an inner ring 5 having an inner-ring raceway 4 around the outer-circumferential surface thereof, and a plurality of cylindrical rollers 6, each being a cylindrical rolling body, arranged between the outer-ring raceway 2 and the inner-ring raceway 4 so as to be able to roll freely. The outer ring 3 has inward-facing flange sections 7 that project inward in the radial direction on both side sections in the axial direction. The inner ring 5 has an outward-facing flange section 8 that projects outward in the radial direction on one side section in the axial direction (right side in FIG. 1). The cylindrical rollers 6 are held in pockets 10 that are formed at a plurality of locations uniformly spaced in the circumferential direction of a retainer 9 so as to be able to roll freely. In this state, the cylindrical rollers 6 are arranged such that the outside section in the radial direction of one end surface in the axial direction closely faces or comes in sliding contact with the inside surface of the inward-facing flange section 7 on one side in the axial direction and the inside surface of the outward-facing flange section 8, and the outside section in the radial direction of the other end surface in the axial direction closely faces or comes in sliding contact with the inward-facing flange section 7 on the other side in the axial direction.

FIG. 2 illustrates a cylindrical roller 6 of the cylindrical roller bearing 1. The cylindrical roller 6 is made of metal such as bearing steel or the like, and is configured as a whole in a solid cylindrical shape. The cylindrical roller 6 includes a cylindrical surface shaped rolling surface 11 as an outer-circumferential surface, circular flat surfaces 12 as both end surfaces in the axial direction orthogonal to the central axis of the cylindrical roller 6, and chamfered sections 13 having an arc-shaped cross section connecting the rolling surface 11 and the flat surfaces 12.

FIG. 3 and FIG. 4 illustrate a needle roller bearing 14 as a rolling bearing. The needle roller bearing 14 includes an outer ring 3a having an outer-ring raceway 2a around the inner-circumferential surface thereof, and a plurality of needles 15, each being a cylindrical rolling body. The needles 15 are held in pockets 10a formed at a plurality of locations uniformly spaced in the circumferential direction of a retainer 9a, and in this state, are arranged between the outer-ring raceway 2a and an inner-ring raceway that is formed around the outer-circumferential surface of a shaft member (not illustrated in the figure).

FIG. 5 illustrates a needle 15 of the needle roller bearing 14. The needle 15 is made of metal such as bearing steel or the like, and similar to the cylindrical roller 6 illustrated in FIG. 2, the needle 15 is configured as a whole in a solid cylindrical shape. In other words, the needle 15 includes a cylindrical-surface shaped rolling surface 11a as an outer-circumferential surface, are circular flat surfaces 12a as both end surfaces in the axial direction that are orthogonal to the center axis of the needle 15, and chamfered sections 13a having an arc-shaped cross section connecting the rolling surface 11a and the flat surfaces 12a. The needle 15 is such that the ratio of the axial dimension with respect to the diameter is larger than the cylindrical roller 6.

Manufacturing a cylindrical rolling body such as the cylindrical roller 6 and needle 15 is generally performed as disclosed in JP-S63-278629A by a process in which an intermediate material is compression molded between a pair of molds, then in a later process, the excess material that is generated in a portion in the axial direction of the outside part in the radial direction during compression molding is removed from the intermediate material after compression molding, and finally the outer-circumferential surface and the end surfaces and the like are finished to form the rolling surface and flat surfaces.

More specifically, when manufacturing a cylindrical rolling body, for example, the molding device 16 illustrated in FIG. 6A and FIG. 6B is used. The molding device 16 includes a stationary-side mold 17 and a movable-side mold 18 that correspond to the pair of molds. The stationary-side mold 17 and the movable-side mold 18 have bottomed cylindrical-shaped molding concave sections 19 that open to one side surfaces in the axial direction facing each other. The inner surface of each of the molding concave sections 19 includes an inner-circumferential surface 20, a bottom surface 21, and an annular-shaped corner R section 22 having an arc shape cross section that connects the inner-circumferential surface 20 and the bottom surface 21.

As illustrated in FIG. 6A, a solid cylindrical-shaped intermediate material 23 is set between the stationary-side mold 17 and the movable-side mold 18. In this state, as illustrated in FIG. 6B, the intermediate material 23 is compression molded by moving the movable-side mold 18 in the axial direction toward the stationary-side mold 17, and as illustrated in FIG. 6B an intermediate material 23a is obtained.

The intermediate material 23 has a larger axial dimension and a smaller outer-diameter dimension than the completed cylindrical rolling body. Particularly, the outer-diameter dimension of the intermediate material 23 is larger than the inner-diameter dimension of the corner R section 22 (diameter dimension of the bottom surface 21) and smaller than the outer-diameter dimension of the corner R section 22 (inner-diameter dimension of the inner-circumferential surface 20). Therefore, as illustrated in FIG. 6A, in a state in which the intermediate material 23 is set between the stationary-side mold 17 and the movable-side mold 18, the outer-circumferential edges of the both end edge sections in the axial direction of the intermediate material 23 come in contact first with the respective corner R sections 22.

From this state, as the intermediate material 23 is compressed by axially moving the movable-side mold 18 toward the stationary-side mold 17, the material of the intermediate material 23 begins to flow from the vicinity of the corner R sections 22 and recesses 24 are formed in the central sections of the both end surfaces in the axial direction of the intermediate material 23. Then, from the stage in which the outside sections in the radial direction of the both end surfaces in the axial direction of the intermediate material 23 come in contact with the corner R sections 22 and the bottom surfaces 21 to some extent, the recesses 24 in the central sections of the both end surfaces in the axial direction of the intermediate material 23 remain, and in this state, compression molding of the intermediate material 23 preferentially proceeds in a direction in which the outer-diameter dimension becomes larger. At this time, a part of the material of the intermediate material 23 bulges into a gap 25 between the stationary-side mold 17 and the movable-side mold 18. As a result, as illustrated in FIG. 6B, in the intermediate material 23a after the compression molding, the recesses 24 in the both end surfaces in the axial direction remain, and excess material 26 is formed on the outside section in the radial direction of the middle section in the axial direction. In this way, since the material of the intermediate material 23 immediately fills the inner-circumferential surfaces 20 of the molding concave sections 19, the excess material 26 bulges into the gap 25 before the material is sufficiently filled toward the bottom surfaces 21 of the molding concave sections 19.

After the compression molding, the intermediate material 23a is removed from between the stationary-side mold 17 and the movable-side mold 18, after which, in a post process, finishing such as flattening the both end surfaces in the axial direction, including removing the excess material 26 and removing the recesses 24, smoothing the outer-circumferential surface, and the like is performed, whereby the shape and dimensions required for the cylindrical rolling body are given.

In this way, in the manufacturing of a conventional cylindrical rolling body, it is required to remove the excess material 26 and remove the recesses 24 in a post process. However, in the case of removing the excess material 26 by forging in a post process, handling the scrap material is difficult. For example, there is a possibility that scraps will remain without being properly discharged from the mold, and will be engulfed and molded into the next product. Moreover, in a post process, in the case of performing a process that includes removing the excess material 26 and removing the recesses 24 by grinding, there is a problem in that the processing expense is large, processing requires a long time, and the manufacturing cost becomes high.

In JP2007-083259A, a technique of a method for manufacturing a cylindrical rolling body is disclosed in which, by performing compression molding of an intermediate material after first forming holes with bottoms in the both end surfaces in the axial direction of the intermediate material, excess material escapes into the inner-circumferential surfaces of the holes with bottoms, and prevents excess material from bulging into the outside section in the radial direction. However, with this conventional technique, it is inevitable that the holes with bottoms will remain in the both end surfaces in the axial direction of the completed cylindrical rolling body. Therefore, this conventional technique cannot be adopted in the case where the cylindrical rolling body to be manufactured is of a solid structure having no holes with bottoms in the both end surfaces in the axial direction.

CITATION LIST

Patent Literature

JP-S63-278629A
JP2007-083259A

SUMMARY OF INVENTION

Technical Problem

Taking the above-described circumstances into consideration, the object of the present invention is to provide a molding device for manufacturing a cylindrical rolling body and a method for manufacturing a cylindrical rolling body, such that when manufacturing a cylindrical rolling body having a solid structure, excess material on the outside section in the radial direction and recesses in the both end surfaces in the axial direction can be prevented from occurring as much as possible in an intermediate material that is removed from the molding device for performing compression molding.

Solution to Problem

The molding device of the present invention is used for manufacturing a cylindrical rolling body and includes a pair of molds having one side surfaces in an axial direction and arranged so as to be capable of relative displacement in the axial direction with the one side surfaces in the axial direction facing each other.

The pair of molds has bottomed molding concave sections opening at positions on the one side surfaces in the axial direction facing each other and each having an inner surface.

The inner surface of each of the molding concave sections has an inner-circumferential surface, a bottom surface, and an annular corner R section having an arc-shaped cross section and connecting the inner-circumferential surface and the bottom surface.

At least one mold of the pair of molds has an annular concave section recessed outward in a radial direction on the inner-circumferential surface of the molding concave section.

Each of the pair of molds includes a die and a knockout pin that are combined so as to be capable of relative displacement in the axial direction. In this configuration, at least a central section of the bottom surface of the inner surface of the molding concave section is configured by a tip-end section of the knockout pin, and the remaining portion of the inner surface of the molding concave section is formed in the die.

The manufacturing method for a cylindrical rolling body of the present invention is executed using a molding device according to the present invention, and includes the following steps. In other words, a cylindrical intermediate material having a dimension in the axial direction that is larger than and a diameter dimension that is smaller than those of a cylindrical rolling body to be manufactured is prepared; both side sections in the axial direction of the intermediate material are respectively inserted inside the molding concave sections of the pair of molds; and outer-circumferential edge sections of both end edge sections in the axial direction of the intermediate material are respectively brought in contact with the corner R sections of the molding concave sections of the pair of molds preferably around the substantially entire circumference. In this state, the intermediate material is plastically deformed by compressing the intermediate material by bringing the pair of molds close to each other in the axial direction to compression mold the intermediate material; and a part of the material of the intermediate material is made to enter into the inside of the annular concave section, forming an undercut section in a part of the outside section in the radial direction of the intermediate material. After that, both side sections in the axial direction of the intermediate material are removed from the inside molding concave sections of the pair of molds in the axial direction; and when doing this, the undercut section is reduced in diameter by drawing the undercut section through a stepped section existing on an end section in the axial direction of the annular concave section.

As the molding device, construction is used in which the pair of molds each have the die and the knockout pin, and the operation of removing both side sections in the axial direction of the intermediate material from the inside of the molding concave sections of the pair of molds in the axial direction is performed based on causing the tip-end sections of the knockout pins to protrude inside the molding concave sections.

The manufacturing method for a rolling bearing of the present invention is related to manufacturing a rolling bearing that includes cylindrical rolling bodies, wherein the cylindrical rolling bodies are manufactured by the manufacturing method of the present invention.

The manufacturing method for a vehicle of the present invention relates to a manufacturing method for a vehicle in which a rolling bearing that includes cylindrical rolling bodies is assembled, wherein the cylindrical rolling bodies are manufactured by the manufacturing method of the present invention.

The manufacturing method for a mechanical apparatus of the present invention relates to a manufacturing method for a mechanical apparatus in which a rolling bearing that includes cylindrical rolling bodies is assembled, wherein the cylindrical rolling bodies are manufactured by the manufacturing method of the present invention. It should be noted that the type of power is irrelevant to the mechanical devices to be manufactured.

Effect of Invention

With the present invention, in the manufacture of a cylindrical rolling body, excess material on an outside section in the radial direction and recesses in both end surfaces in the axial direction are not generated as much as possible in the intermediate material that is removed from a molding device for performing compression molding.

BRIEF DESCRIPTION OF DRAWINGS

FIG. 9 is an enlarged view of a portion B in FIG. 7D.

FIG. 10A is a cross-sectional view illustrating a compression-molded intermediate material in a state before being removed from the molding device, and FIG. 10B is a cross-sectional view after removing the compression-molded intermediate material from the molding device.

DESCRIPTION OF EMBODIMENTS

Figure 1:
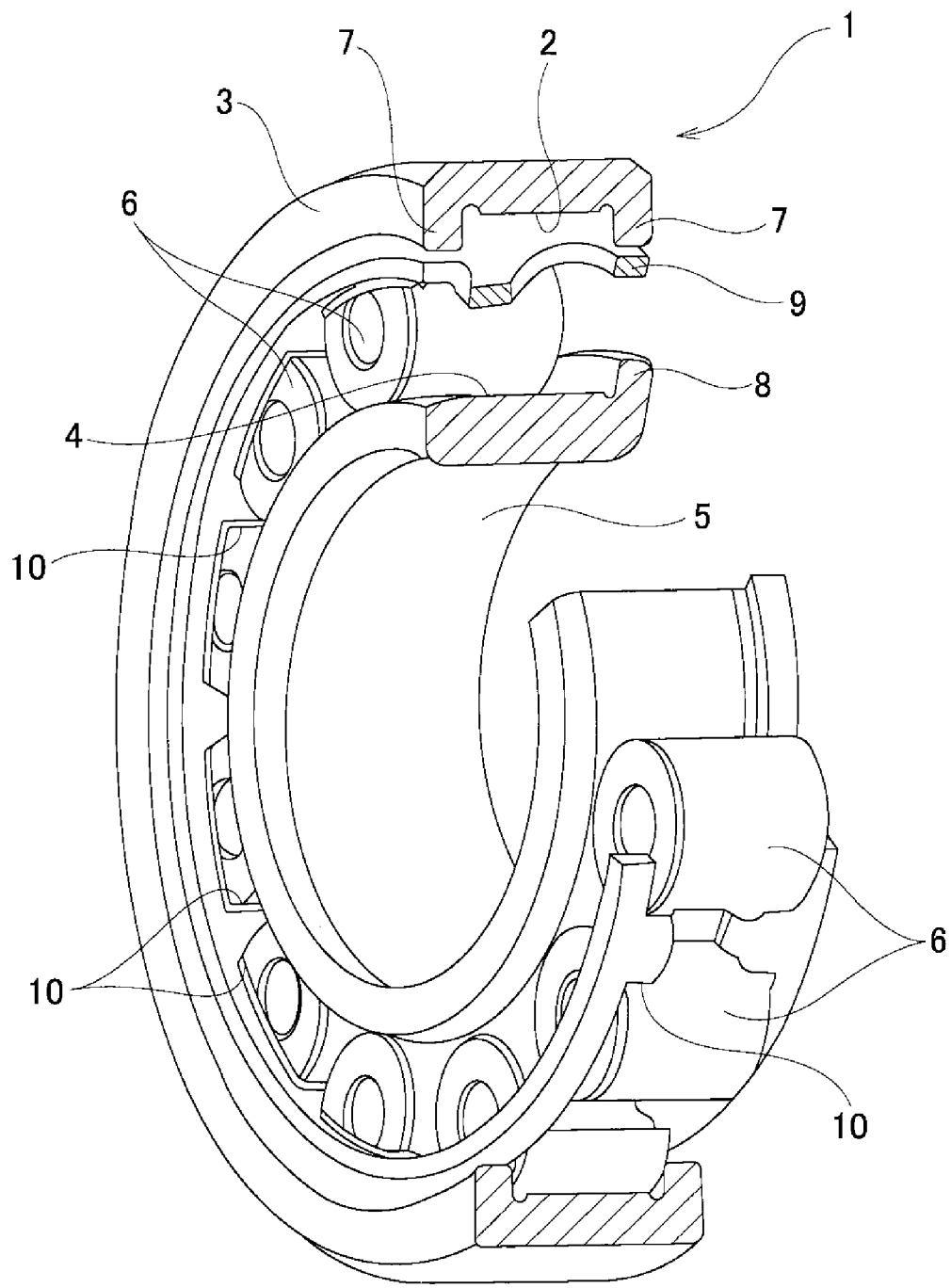
FIG. 1 is a partial cutaway perspective view of an example of a cylindrical roller bearing.

Embodiments of the present invention will be described using FIG. 7A to FIG. 11C.

<Molding Device for Manufacturing Cylindrical Rolling Body>

FIG. 7A to FIG. 7D illustrate a molding device 16a for manufacturing a cylindrical roller 6 corresponding to a cylindrical rolling body. The molding device 16a includes a stationary-side mold 17a and a movable-side mold 18a corresponding to a pair of molds having one side surfaces in the axial direction (up-down direction in FIG. 7A to FIG. 7D) and arranged so as to be capable of relative displacement in the axial direction with the one side surfaces in the axial direction facing each other.

The stationary-side mold 17a and the movable-side mold 18a have bottomed molding concave sections 19a that open at positions on the one side surfaces in the axial direction facing each other. The inner surface of each of the molding concave sections 19a includes a stepped cylindrical surface shaped inner-circumferential surface 20a, a circular flat surface shaped bottom surface 21 that is orthogonal to the center axis, and an annular shaped corner R section 22a having an arc-shaped cross section that connects the inner-circumferential surface 20a and the bottom surface 21.

An annular concave section 27 that is recessed radially outward is formed all around the circumference of the middle section in the axial direction of the inner-circumferential surface 20a of the molding concave section 19a. The annular concave section 27 is arranged at a position on the inner-circumferential surface 20a close to the bottom surface 21. The inner surface of the annular concave section 27 includes a cylindrical surface shaped bottom section 28, and stepped sections located at positions on both sides in the axial direction of the bottom section 28; and more specifically, the stepped sections include a stepped section 29a located on the opening side of the molding concave section 19a, and a stepped section 29b located on the bottom surface 21 side of the molding concave section 19a. Each of the stepped sections 29a, 29b is a partial conical surface inclined in a direction going away from the bottom section 28 in the axial direction while going toward the inside in the radial direction. Of the inner-circumferential surface 20a, the sections on both sides in the axial direction separated from the annular concave section 27 are cylindrical surfaces that have inner-diameter dimensions that are equal to each other. However, in the case of embodying the present invention, the inner-diameter dimensions of these sections on both sides in the axial direction may differ from each other.

In addition, the stationary-side mold 17a and the movable-side mold 18a respectively include dies 30a, 30b that are combined so that relative displacement in the axial direction is possible and knockout pins 31a, 31b. Of the inner surfaces of the molding concave sections 19a, the sections on the inside in the radial direction that include the center sections of the bottom surfaces 21 are configured by the tip-end sections of the knockout pins 31a, 31b. Of the inner surfaces of the molding concave sections 19a, the remaining portions that exclude the sections on the inside in the radial direction of the bottom surfaces 21, or in other words, the outside sections in the radial direction of the bottom surfaces 21, the inner-circumferential surfaces 20a that include the annular concave sections 27, and the corner R sections 22 are formed in the dies 30a, 30b. The knockout pins 31a, 31b are provided with an elastic force that acts in the axial direction toward each other by elastic members (not illustrated). Therefore, in a state in which the intermediate material 23 is set in the molding device 16a, the inside sections in the radial direction of the bottom surfaces 21 configured by the tip-end sections of the knockout pins 31a, 31b protrude further than the outside sections in the radial direction of the bottom surfaces 21 formed in the dies 30a, 30b, so it is possible to grasp the intermediate material 23 in the axial direction.

<Manufacturing Method for Cylindrical Rolling Body>

In the manufacturing method for a cylindrical rolling body of this embodiment, first a metal solid cylindrical-shaped intermediate material 23 is prepared so that the dimension in the axial direction is larger and the dimension in the radial direction is smaller than the cylindrical roller 6 that is to be manufactured. The outer diameter dimension $d_{23}$ of the intermediate material 23 is smaller than the inner-diameter dimension $d_{20a}$ of the inner-circumferential surface 20a of the molding concave section 19a on both side sections in the axial direction separated from the annular concave section 27, and is larger than the inner-diameter dimension $d_{22}$ (the diameter dimension of the bottom surface 21) of the corner R section 22 of the molding concave section 19a ($d_{20a} > d_{23} > d_{22}$).

Figure 7A:
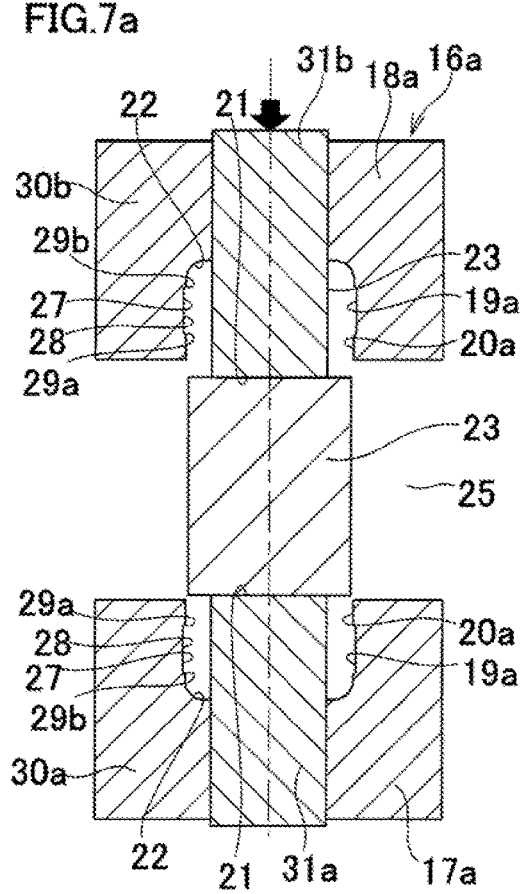
FIG. 7A to FIG. 7D are cross-sectional views illustrating a molding device for manufacturing a cylindrical rolling body according to a first example of an embodiment of the present invention, and sequentially illustrate a process of performing compression molding of an intermediate material by the molding device.
Figure 7B:
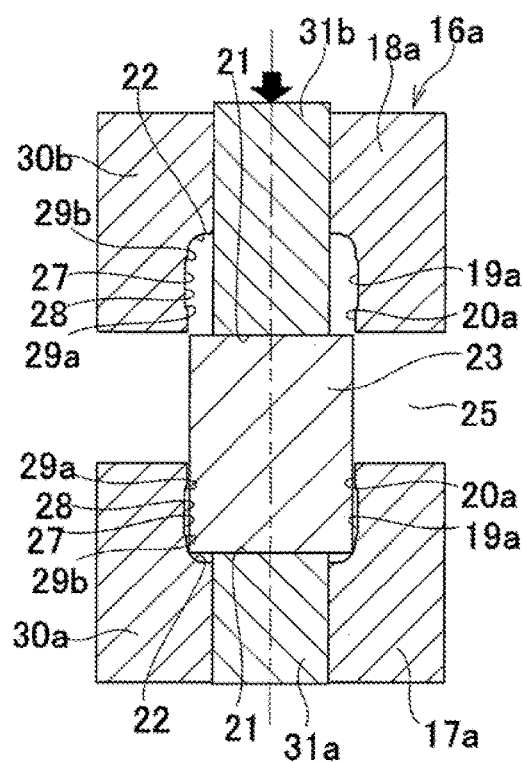

Next, as illustrated in FIG. 7A, the intermediate material 23 is set between the stationary-side mold 17a and the movable-side mold 18a. More specifically, both end surfaces in the axial direction of the intermediate material 23 are brought into contact with the tip-end sections of the knockout pins 31a, 31b, and the intermediate material 23 is held in the axial direction by the knockout pins 31a, 31b. From this state, as illustrated in FIG. 7B to FIG. 7C, the movable-side mold 18a is moved, the knockout pin 31a is moved back against the elastic force, one of both side sections in the axial direction of the intermediate material 23 is inserted into the molding concave section 19a of the stationary-side mold 17a, the movable-side mold 18a is further moved, and while moving the knockout pin 31b back against the elastic force, the other of both side sections in the axial direction of the intermediate material 23 is inserted into the molding concave section 19a of the movable-side mold 18a, and the outer peripheral edge sections of both end sections in the axial direction of the intermediate material 23 are brought into contact with the corner R sections 22 of the respective molding concave sections 19a around the substantially entire circumference.

Figure 7C:
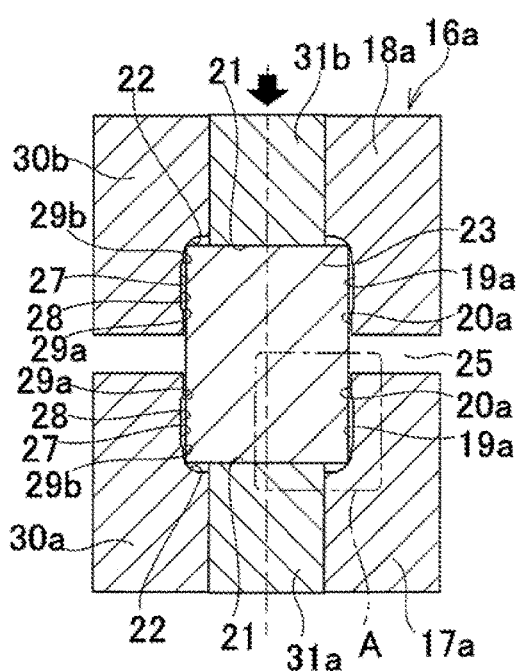
Figure 7D:
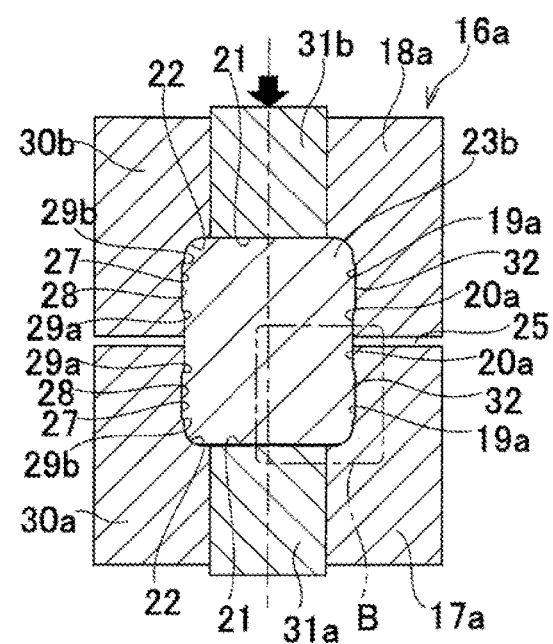

From this state, as illustrated in FIG. 7D, when the movable-side mold 18a is further moved toward the stationary-side mold 17a, the knockout pins 31a, 31b are further moved back against the respective elastic forces. As a result, the inside sections in the radial direction of the bottom surfaces 21 constituted by the tip-end sections of the knockout pins 31a, 31b, and the outside sections in the radial direction of the bottom surfaces 21 formed on the dies 30a, 30b are located on the same plane. While in this state, by further moving the movable-side mold 18a, the intermediate material 23 is compression molded to obtain the intermediate material 23b.

Figure 6A:
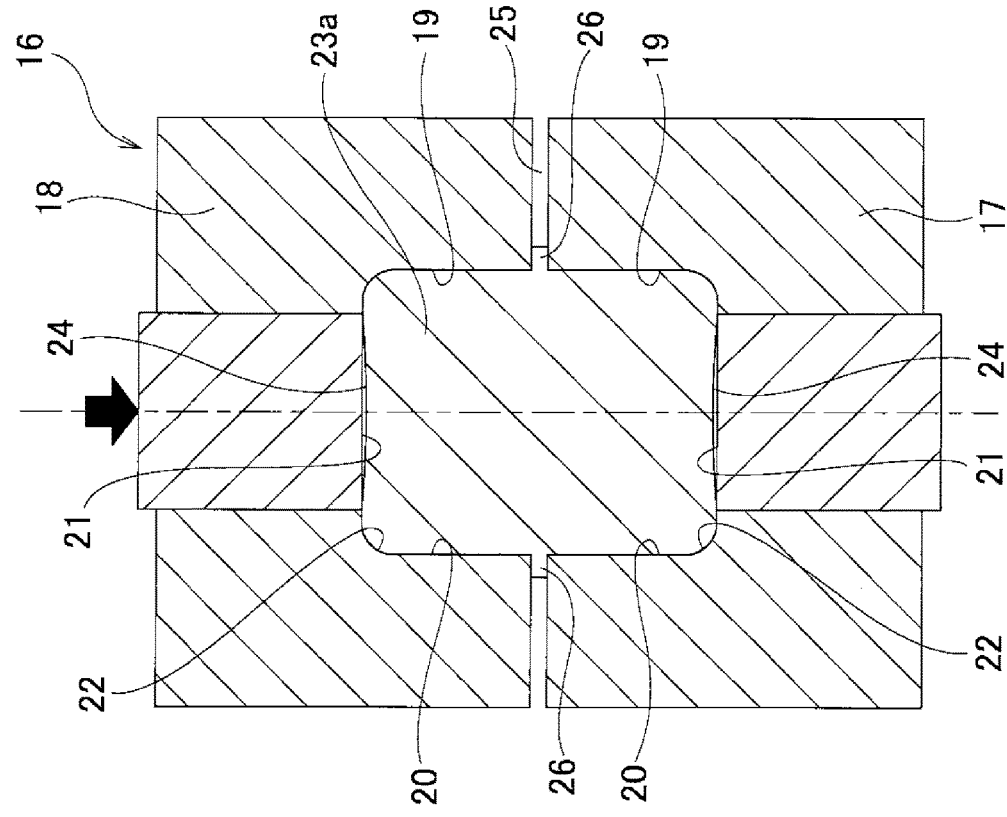
FIG. 6A and FIG. 6B are cross-sectional views illustrating a conventional molding device for manufacturing a cylindrical rolling body and sequentially illustrate a process of performing compression molding of an intermediate material by the molding device.
Figure 6B:
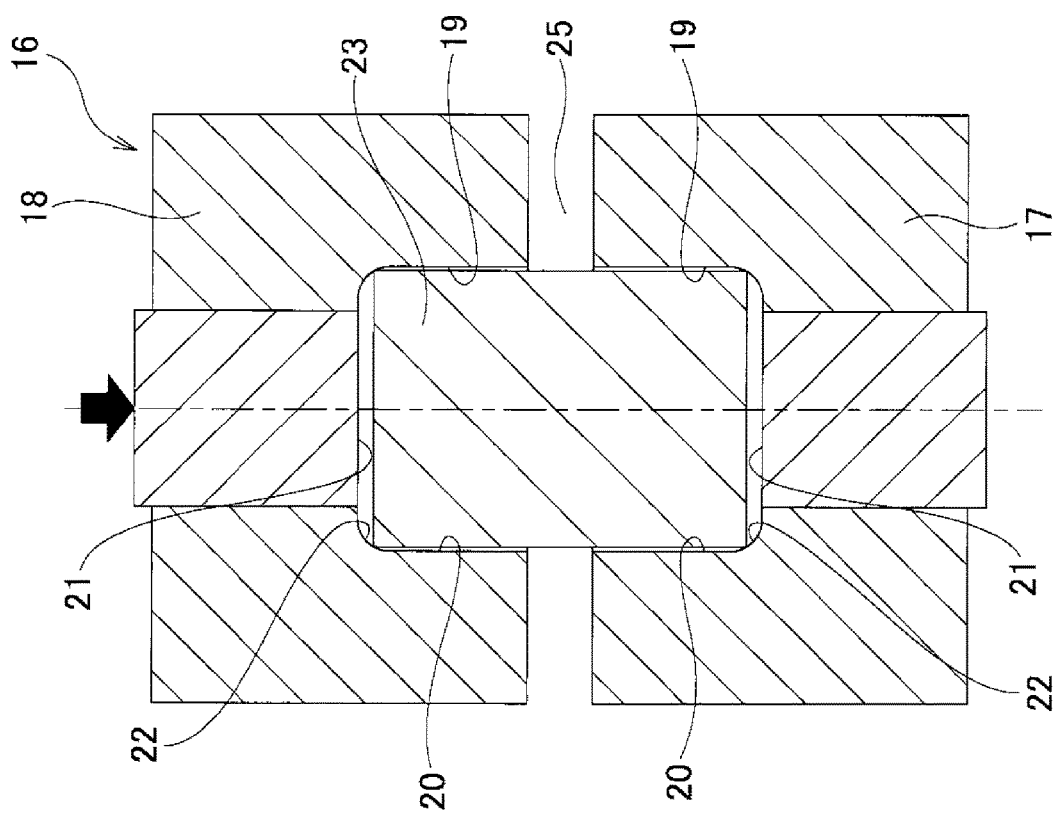

In this case, in this example, due to the presence of the annular concave sections 27 on the inner-circumferential surfaces 20a of the molding concave sections 19a, a part of the material of the intermediate material 23 enters the inside of the annular concave sections 27. Therefore, it is possible to increase the flow of the material when the intermediate material 23 is compression molded inside the molding concave sections 19a. So it is possible to prevent the flow of the material toward the bottom surfaces 21 from stopping during compression molding. As a result, it is possible to minimize the formation of the recesses 24 (see FIG. 6B) on both end surfaces in the axial direction of the intermediate material 23b after compression molding, and it is possible to minimize the formation of excess material 26 (see FIG. 6B) on the outside section in the radial direction of the middle section in the axial direction of the intermediate material 23b after compression molding. This point will be described in more detail below.

From the state illustrated in FIG. 7C, by moving the movable-side mold 18a in the axial direction toward the stationary-side mold 17a, the material of the intermediate material 23 starts to flow from the vicinity of the corner R sections 22 as the intermediate material 23 is compressed. Then, from the stage where the outside sections in the radial direction of both end surfaces in the axial direction of the intermediate material 23 are in contact somewhat with the corners R sections 22 and the bottom surfaces 21, compression molding of the intermediate material 23 preferentially proceeds in a direction in which the outer-diameter dimension increases. The molding process up to this point is similar to the conventional manufacturing method illustrated in FIG. 6A and FIG. 6B.

In the conventional manufacturing method, after that, the material of the intermediate material 23 immediately fills the inner-circumferential surface of the molding concave sections 19, and while the material is not sufficiently filled toward the bottom surfaces 21 of the molding concave sections 19, the excess material 26 bulges into the gap 25 on the outside in the radial direction.

On the other hand, in this example, after that, as the material of the intermediate blank 23 fills the annular concave sections 27, the flow of the material increases. Therefore, the material of the intermediate material 23 continues to flow toward the bottom surfaces 21 of the molding concave sections 19a, and it is possible to promote filling of the material toward the bottom surfaces 21 of the molding concave sections 19a. Moreover, since the material tends to be filled toward the bottom surfaces 21 in this manner, there is no need to apply unnecessary compression force to the intermediate material 23 for the purpose of filling the material toward the bottom surfaces 21, and as a result, compression molding can be completed before the material of the intermediate material 23 enters the gap 25 between the movable-side mold 18a and the stationary-side mold 17a forming an excess material.

Incidentally, in embodying the present invention, from the aspect of enhancing the effect of promoting the filling of the material toward the bottom surfaces 21 of the molding concave sections 19a based on the presence of the annular concave sections 27, the annular concave sections 27, as in this example, are such that the bottom sections 28 of the annular concave sections 27 are not continuous with the corner R sections 22, however, are preferably located in the vicinity of or adjacent to the corner R sections 22, or in other words, near the bottom surfaces 21.

Figure 8:
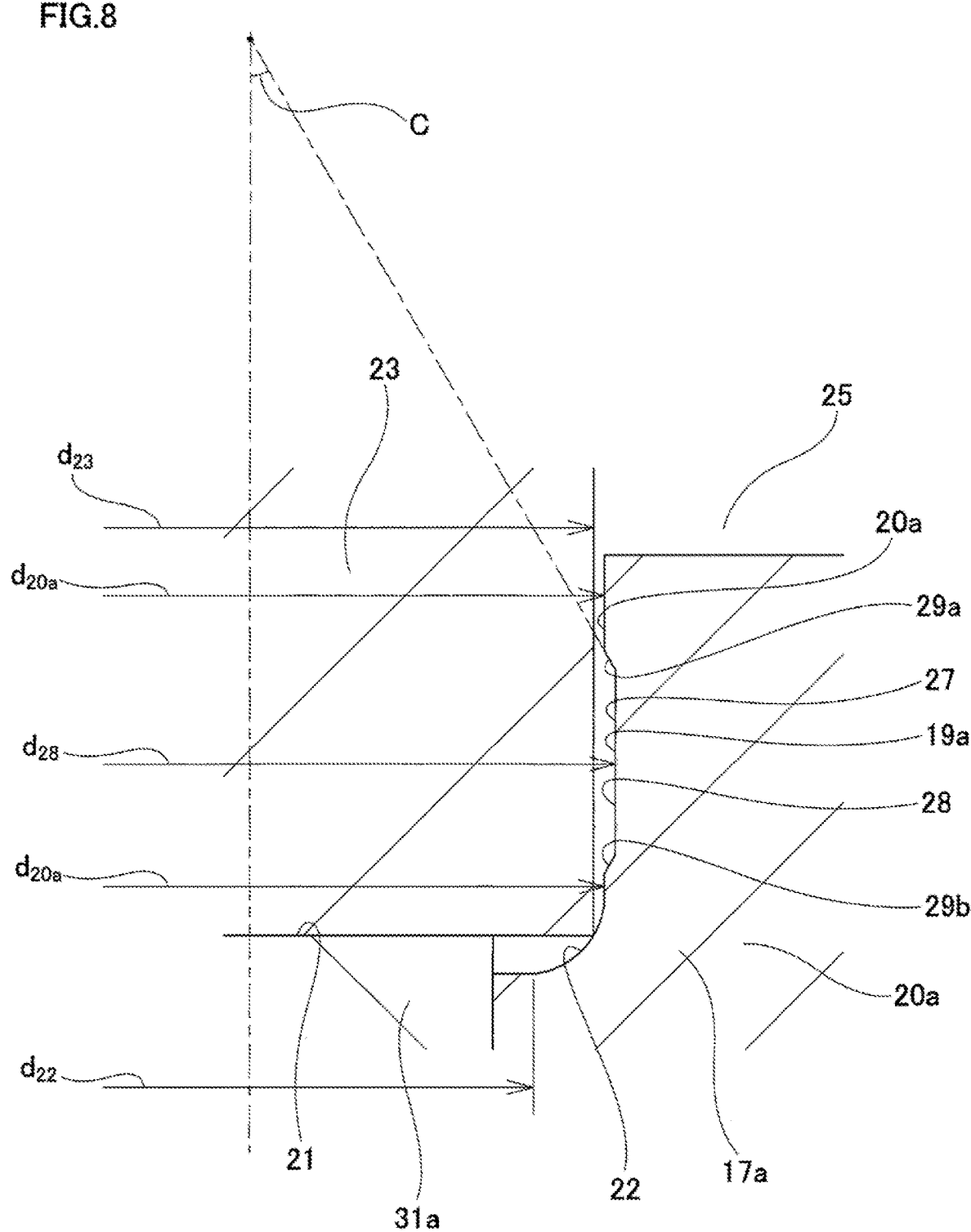
FIG. 8 is an enlarged view of a portion A in FIG. 7C.

In addition, as illustrated in FIG. 8, in this example, the inner-diameter dimension $d_{20a}$ of the inner-circumferential surface 20a of the molding concave section 19a that is farther from the bottom surface 21 than the annular concave section 27 is smaller than the inner-diameter size $d_{28}$ of the bottom section 28 of the annular concave section 27 ($d_{20a} < d_{28}$). Therefore, the section (section $d_{29a}$) of the inner-circumferential surface 20a that is farther from the bottom surface 21 than the annular concave section 27 acts to suppress collapse (compression in the axial direction) of the middle section in the axial direction that is the most easily deformable section of the intermediate material 23. From this as well, it is possible to prevent the material of the middle section in the axial direction of the intermediate material 23 from being pushed out into the gap 25 and the excess material from bulging into the gap 25, and it is possible to promote filling of the material to the bottom surface 21 of the molding concave section 19a.

Moreover, in this example, the initial outer diameter $d_{23}$ of the intermediate material 23 is smaller than the inner diameter $d_{20a}$ of both side sections in the axial direction of the inner-circumferential surfaces 20a of the molding concave sections 19a that are separated from the annular concave sections 27 ($d_{23} < d_{20a}$). Therefore, deformation of the entire intermediate material 23 becomes large at the initial stage of compression molding of the intermediate material 23, and accordingly, the effect of promoting the filling of the material toward the bottom surfaces 21 of the molding concave sections 19a can be enhanced.

In addition, in this example, as illustrated in FIG. 7D, at the point in time when the compression molding is completed, the material of the intermediate material 23b is filled in the inside of the annular concave sections 27 to some extent. In other words, as illustrated in FIG. 7D, FIG. 9 and FIG. 10A, on the outside sections in the radial direction of the sections near both ends in the axial direction of the intermediate material 23b at this point in time, undercut sections 32 are formed by a portion filled inside the annular concave sections 27, and the outer-diameter dimension becomes larger than the portions adjacent to both sides in the axial direction of the undercut sections.

Next, in this example, as illustrated in FIG. 7D, from the state where compression molding is completed, the movable-side mold 18a is moved back in the axial direction from the stationary-side mold 17a. At this time, first, only the die 30b of the movable-side mold 18a is moved back, and the knockout pin 31b advances relative to the die 30b, in other words, stops at that position as is and restricts the movement of the intermediate material 23b. As the movable-side mold 18a moves further back, the knockout pin 31b also moves back. As a result, the chuck (not illustrated) is advanced to the position of the stationary-side metal mold 17a, and the chuck is kept standby in a closed state. After that, by causing the tip-end section of the knockout pin 31a to protrude to the inside of the molding concave section 19a of the stationary-side mold 17a, the intermediate material 23b is pushed in the axial direction into the chuck. The intermediate material 23b is conveyed to the next process by the chuck in a state of being fixed to the chuck. When only the die 30b of the movable-side mold 18a moves back, and when the intermediate material 23b is extruded from the stationary-side mold 17a by the knockout pin 31a, the undercut sections 32 existing in the outside sections in the radial direction of the sections near both ends in the axial direction of the intermediate material 23b are reduced in diameter by being drawn through or handled by stepped sections 29a existing at the one end sections in the axial direction of the annular concave sections 27 (opening side of the molding concave sections 19a), and as a result, an intermediate material 23c as illustrated in FIG. 10B is obtained.

The intermediate material 23c removed from the molding device 16a in this way has slight unevenness in the axial direction remaining on the outer-circumferential surface, however, this outer-circumferential surface is such that the generating line shape is substantially linear and the outer-diameter dimension is substantially equal to $d_{20a}$. In other words, in this intermediate material 23c, there is substantially no excess material on the outside section in the radial direction and there are no recesses in both end surfaces in the axial direction.

Incidentally, in this example, the annular concave sections 27 are provided in the middle sections in the axial direction of the inner-circumferential surfaces 20a of the molding concave sections 19a. In other words, the annular concave sections 27 and the corner R sections 22 are separated in the axial direction, and are at least connected via stepped sections 29b existing at least on the other side sections in the axial direction of the annular concave sections 27 (the bottom surface 21 sides of the molding concave sections 19a) without the bottom sections 28 of the annular concave sections 27 and the corner R sections 22 being continuous. Therefore, due to the material that flows accompanying the handling or drawing of the undercut sections 32 by the stepped sections 29a existing on the one end sections in the axial direction of the annular concave sections 27 (the opening sides of the molding concave sections 19a), it is possible to suppress the collapse of the shape of the chamfered sections having an arc-shaped cross section that connect the outer-circumferential surface and the axial end surfaces in the axial direction of the intermediate material 23b and the intermediate material 23c that is finally obtained. Note that, in the case of embodying the present invention, the annular concave sections 27 may be provided on the other end sections in the axial direction of the inner-circumferential surfaces 20a of the molding concave sections 19a so as to be adjacent to the corner R sections 22. However, even in the case of adopting such a configuration, from the aspect of suppressing the shape collapse of the chamfered sections of the intermediate material 23b when handling or drawing the undercut sections 32, preferably the bottom sections 28 of the annular concave sections 27 and the corner R sections 22 are not continuous, but the stepped sections 29b are provided on the other side sections in the axial direction of the annular concave sections 27 so that the bottom sections 28 and the corner R sections 22 are connected via the stepped sections 29b. However, in the case where it is permitted to process the collapse of the shape of the chamfered sections having an arc-shaped cross section in the finally obtained intermediate material 23c in a subsequent process, the step sections 29b on the other end side in the axial direction of the annular concave sections 27 may be omitted, and annular concave sections 27 may be provided so that the bottom sections 28 of the annular concave sections 27 and the corner R sections 22 are continuous.

In any case, in this example, after that, in the subsequent process, the necessary shape and dimensions for the cylindrical roller 6 as a cylindrical rolling body are given by performing finishing by grinding the surface of the intermediate material 23c. Particularly, in this example, on the intermediate material 23c, there is hardly any excess material on the outside section in the radial direction, or recessed sections in both end surfaces in the axial direction. Moreover, in the intermediate material 23c, collapse of the shape of the chamfered sections having an arc-shaped cross section is also suppressed. Therefore, it is possible to reduce the machining allowance in the subsequent processes, and to reduce the manufacturing cost of the cylindrical rollers 6.

Incidentally, in the case of embodying the present invention, the difference ($d_{28}-d_{20a}$) between the inner diameter $d_{28}$ of the bottom sections 28 of the annular concave sections 27 and the inner diameter $d_{20a}$ of both side sections in the axial direction of the inner-circumferential surfaces 20a separated from the annular concave sections 27 can be set to an appropriate size according to the outer diameter dimension of the rolling surface 11 of the cylindrical roller 6 to be manufactured. For example, in the finally obtained cylindrical roller 6, in the case where the outer diameter dimension of the rolling surface 11 is several mm to several ten mm, the annular concave sections 27 can be formed so that the above-described difference ($d_{28}-d_{20a}$) is within the range of about 10 µm to 200 µm. In this case, the recessed depth of the annular concave sections 27 is about 5 µm to 100 µm.

In addition, the inclination of the stepped portions 29a existing at the one end sections in the axial direction of the annular concave sections 27 (opening sides of the molding concave sections 19a) having a function of reducing the diameter by handling or drawing the undercut sections 32 formed on the intermediate material 23b, is formed so that, in the cross section including the central axes of the stationary-side mold 17a and the movable-side mold 18a, the angle C with respect to the center axes is set to a predetermined value in the range of 3 degrees to 30 degrees, and preferably in the range of 3 degrees to 15 degrees, and more preferably in the range of 3 degrees to 5 degrees. When this angle C is too large, there is a possibility that instead of reducing the diameter by properly handling or drawing the undercut sections 32, the undercut sections will be processed so as to be cut away by shaving. On the other hand, with respect to the stepped sections 29b existing on the other end sections in the axial direction of the annular concave sections 27 (the bottom surface 21 sides of the molding concave sections 19a), the angle C with respect to the central axes thereof may be in the range of 3 degrees to 20 degrees. In the case where the angle C of the step sections 29b is too large, there is a possibility that the handled material will not fit over the outer-circumferential surface of the intermediate material 23b having the same outer diameter, and will move to the chamfered sections 13a.

In addition, in the case of embodying the present invention, the method for obtaining the intermediate material before compression molding is not particularly limited. For example, a material α obtained by cutting a coil material (wound, small diameter solid steel material) into a predetermined length by a cutting mechanism in a press machine can be used as the intermediate material 23 before compression molding. This kind of material α, as exaggeratedly illustrated in FIG. 11A, may have a rough shape on both end surfaces in the axial direction. However, as long as the degree of roughness of the shape of the end surfaces in the axial direction is not large, in this case as well, basically, the outer-circumferential edge sections on both end edges in the axial direction of the intermediate material 23 come in contact around the substantially entire circumference with the corner R sections 22 of the respective molding concave sections 19a.

Figure 11C:
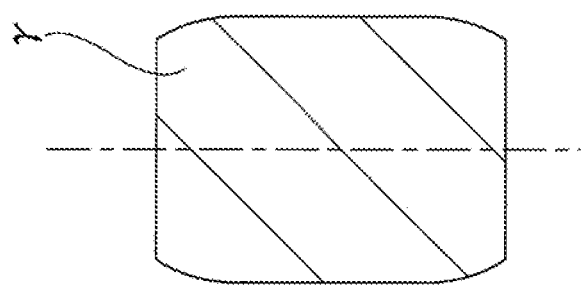
FIG. 11A to FIG. 11C are cross-sectional views illustrating three examples of intermediate materials before compression molding, and are materials that can be used in carrying out the present invention.
Figure 11B:
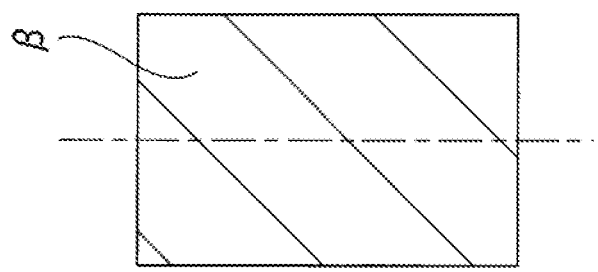
Figure 11A:
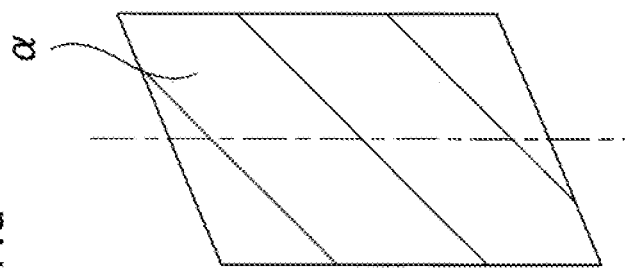

However, in order to certainly bring the outer-circumferential edge sections on both end edges in the axial direction of the intermediate material 23 into contact with the corner R sections 22 of the respective molding concave sections 19a around the substantially entire circumference, a cylindrical material β as illustrated in FIG. 11B that is obtained by performing a correcting process on both end surfaces in the axial direction of the material α can be used as the intermediate material 23 before compression molding. Incidentally, in this case, it is also possible to perform chamfering of the both end edge sections in the axial direction of the material β. Furthermore, it is possible to use a barrel shaped material γ as illustrated in FIG. 11C that is obtained by performing an upsetting process on the material β as the intermediate material 23 before compression molding.

In the present invention, even in the case where any of the materials α, β, γ is used as the intermediate material 23 before compression molding, in the intermediate material 23c removed from the molding device after compression molding, there is little excess material on the outside section in the radial direction, recessed sections in both end surfaces in the axial direction are hardly generated, and the machining allowance in a subsequent process is small. However, the intermediate material 23c can be finished in a subsequent process with the processing cost for material β being less than for material α, and the processing cost for material γ being less than for material β.

In the case of embodying the present invention, an annular concave section 27 can also be provided on the inner-circumferential surface of the molding concave section of any one of the stationary-side mold 17a and the movable-side mold 18a constituting the pair of molds.

Moreover, the shape of the inner surface of the annular concave section 27 is not particularly limited. For example, the shape of the inner surface of the annular concave section 27 is not limited to having a trapezoidal cross section or a rectangular cross section in accordance with the shape required for the finally obtained cylindrical roller 6, and an arc-shaped cross section, a tapered surface shape of which the inner diameter increases or decreases in the direction from one end section in the axial direction toward the other end section in the axial direction, a stepped cylindrical surface shape (crank shaped cross section) that includes straight lines with cross sections having two or more steps, or a combination of these shapes may also be adopted.

In the case of embodying the present invention, the shapes of the stationary-side mold 17a and the movable-side mold 18a constituting a pair of molds are not limited to shapes that are symmetrical in the vertical direction as illustrated in the example in the figures, and the length in the axial direction, the size, shape and the like of constituent elements such as a die, knockout pin or the like may be different between the pair of molds.

In the case of embodying the present invention, the axial direction of the molding device in the state of being used is basically arbitrary, and although the axial direction can be made to coincide with the vertical direction as illustrated in the example, the axial direction may also be made to coincide with the horizontal direction or made to coincide with some other direction.

Figure 2:
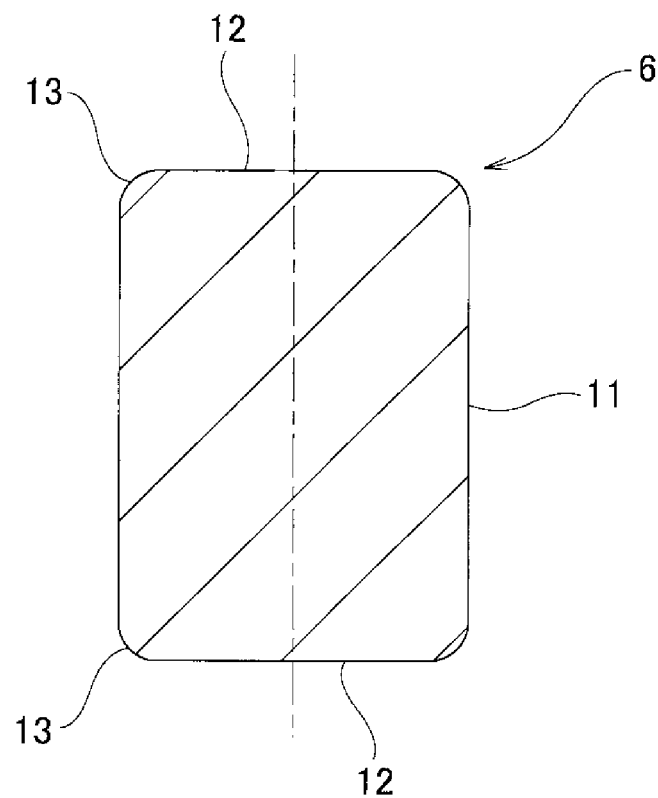
FIG. 2 is a cross-sectional view illustrating one cylindrical roller that is assembled and used in a cylindrical roller bearing and that has been removed.
Figure 3:
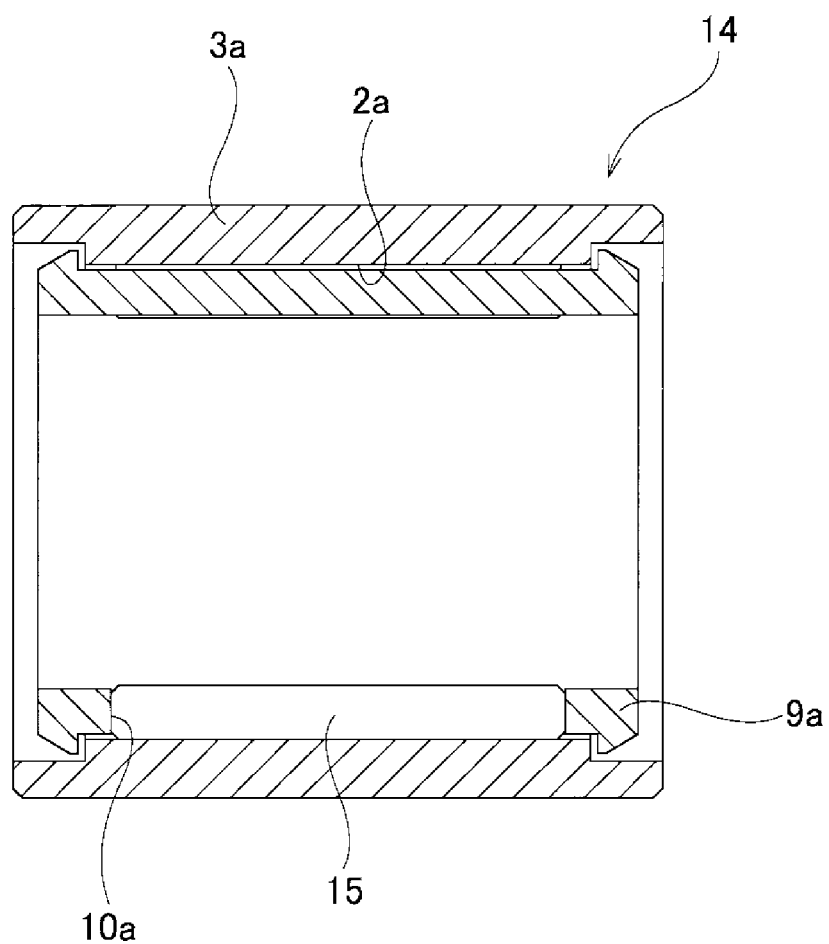
FIG. 3 is a cross-sectional view illustrating an example of a needle roller bearing.
Figure 4:
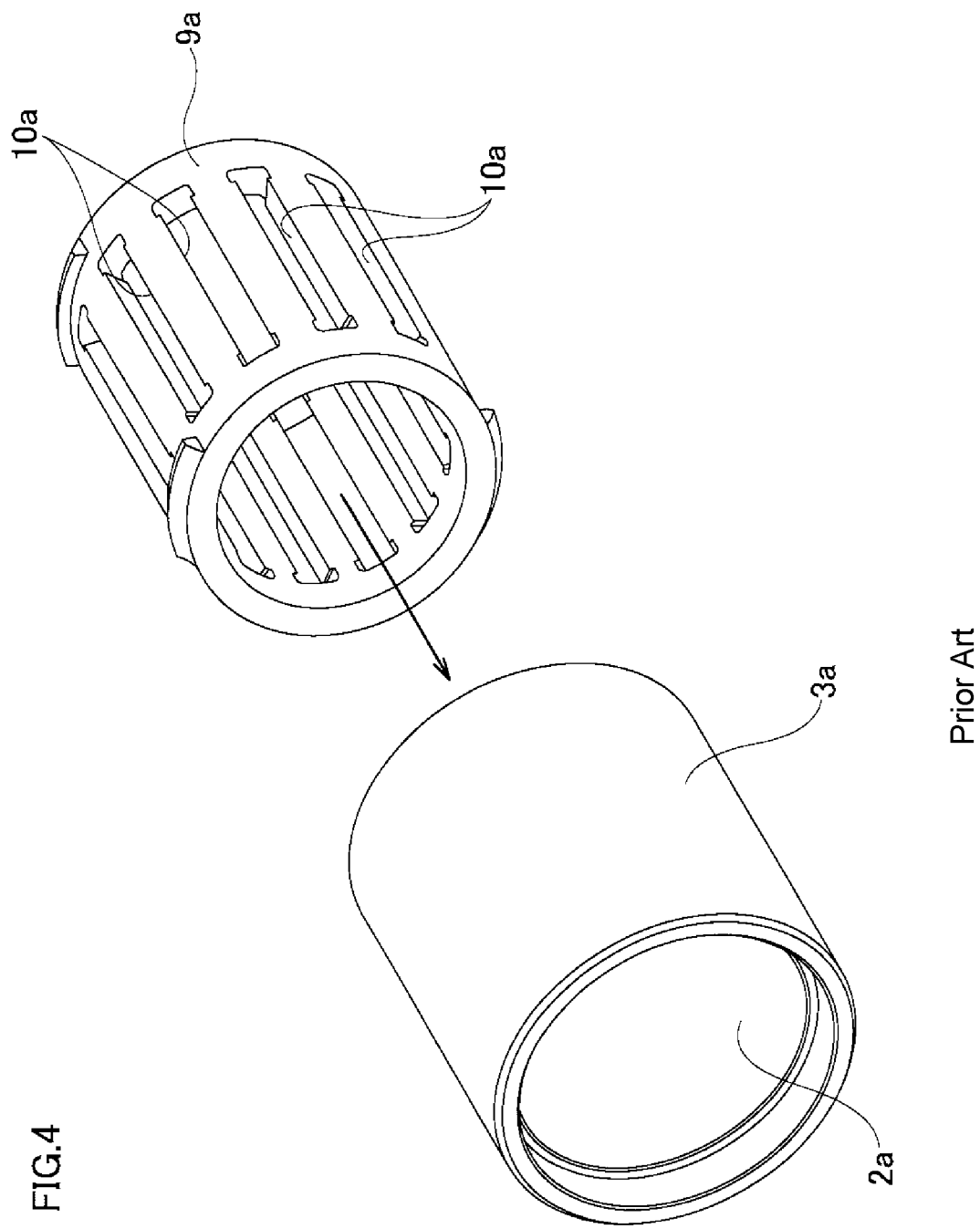
FIG. 4 is a perspective view illustrating an outer ring and a retainer that have been removed and disassembled.
Figure 5:
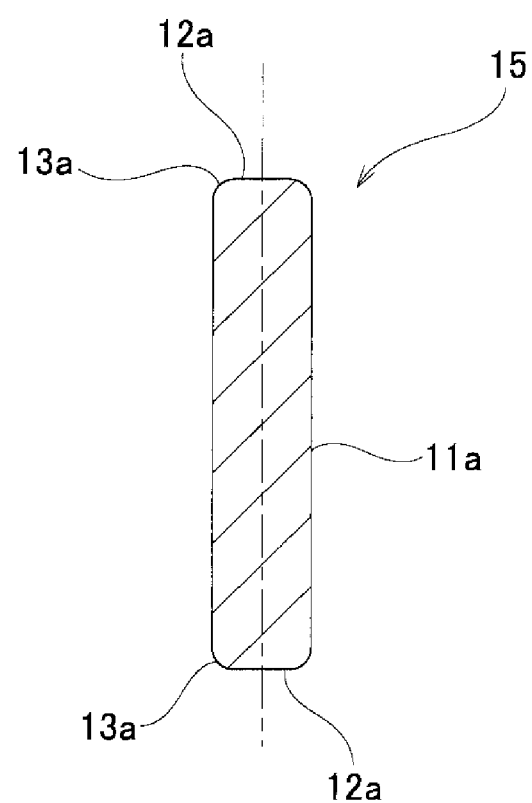
FIG. 5 is a cross-sectional view illustrating one needle that is assembled and used in a needle roller bearing and that has been removed.

As the cylindrical rolling body to be manufactured, not only the cylindrical rollers 6 constituting the cylindrical roller bearing 1 as illustrated in FIG. 1 and FIG. 2 can be adopted, but also a needle 15 of a needle roller bearing 14 assembled in a transmission of an automobile or the like is adopted as illustrated in FIG. 3 and FIG. 5. That is to say, the present invention is widely applicable to the manufacture of these cylindrical rolling bodies. Moreover, the cylindrical rolling body to be manufactured according to the present invention is not limited to a radial rolling bearing but can be assembled in a thrust rolling bearing.

The present invention can also be applied to the manufacture of rolling bearings (cylindrical roller bearings, needle roller bearings) that include cylindrical rolling bodies composed of cylindrical rollers or needles as rolling bodies. In this case, the molding device for manufacturing the cylindrical rolling bodies and the method for manufacturing cylindrical rolling bodies according to the present invention are applied to the manufacture of the cylindrical rolling bodies of these rolling bearings.

The present invention can also be applied to the manufacture of vehicles such as automobiles, railroad cars, industrial vehicles and the like, and various mechanical devices including industrial machines such as machine tools and the like in which rolling bearings that include these cylindrical rolling bodies as rolling bodies are assembled. In this case as well, the molding device for manufacturing the cylindrical rolling bodies and the method for manufacturing cylindrical rolling bodies according to the present invention are applied to the manufacture of the cylindrical rolling bodies of these rolling bearings.

EXPLANATION OF REFERENCE NUMBERS

1 Cylindrical roller bearing
2, 2*a* Outer-ring raceway
3, 3*a* Outer ring
4 Inner-ring raceway
5 Inner ring
6 Cylindrical roller
7 Inward-facing flange section
8 Outward-facing flange section
9, 9*a* Retainer
10, 10*a* Pocket
11, 11*a* Rolling surface
12, 12*a* Flat surface
13, 13*a* Chamfered section
14 Needle roller bearing
15 Needle
16, 16*a* Molding device
17, 17*a* Stationary-side mold
18, 18*a* Movable-side mold
19, 19*a* Molding concave section
20, 20*a* Inner-circumferential surface
21 Bottom surface
22 Corner R section
23, 23*a*, 23*b*, 23*c* Intermediate material
22 Recess
24 Gap
25 Excess material
27 Annular concave section
28 Bottom section
29 Stepped section
30*a*, 30*b* Die
31*a*, 31*b* Knockout pin
32 Undercut section

The invention claimed is:

1. A manufacturing method for a cylindrical rolling body using a molding device for manufacturing a cylindrical rolling body;

the molding device for manufacturing a cylindrical rolling body comprising a pair of molds having one side surfaces in an axial direction and arranged so as to be capable of relative displacement in the axial direction with the one side surfaces in the axial direction facing each other;

the pair of molds having bottomed molding concave sections opening at positions on the one side surfaces in the axial direction facing each other and each having an inner surface; and the inner surface of each of the molding concave sections having an inner-circumferential surface, a bottom surface, and an annular corner R section having an arc-shaped cross section and connecting the inner-circumferential surface and the bottom surface;

the manufacturing method comprising:

preparing a cylindrical intermediate material having a dimension in the axial direction that is larger than and a diameter dimension that is a smaller than those of a cylindrical rolling body to be manufactured;

inserting both side sections in the axial direction of the intermediate material inside the molding concave sections of the pair of molds respectively; and compressing the intermediate material by bringing the pair of molds close to each other in the axial direction and plastically deforming the intermediate material; to compression mold the intermediate material; and removing the both side sections in the axial direction of the intermediate material from the inside of the molding concave sections of the pair of molds in the axial direction;

wherein at least one mold of the pair of molds has an annular concave section recessed outward in a radial direction on the inner-circumferential surface of the molding concave section;

when compression molding the intermediate material, a part of the material of the intermediate material being made to enter into the inside of the annular concave section, forming an undercut section in a part of the outside section in the radial direction of the intermediate material; and when removing the both side sections in the axial direction of the intermediate material, the undercut section being reduced in diameter by drawing the undercut section through a stepped section existing on an end section in the axial direction of the annular concave section.

2. The manufacturing method for a cylindrical rolling body according to claim 1, wherein each of the pair of molds comprises a die and a knockout pin that are combined so as to be capable of relative displacement in the axial direction;

at least a central section of the bottom surface of the inner surface of the molding concave section is configured by a tip-end section of the knockout pin; and the remaining portion of the inner surface of the molding concave section is formed in the die; and the operation of removing the both side sections in the axial direction of the intermediate material from the inside of the molding concave sections of the pair of molds in the axial direction is performed based on causing the tip-end section of the knockout pin to protrude inside the molding concave section.

3. A manufacturing method for a rolling bearing that comprises cylindrical rolling bodies, wherein the cylindrical rolling bodies are manufactured by the manufacturing method according to claim 1.

4. A manufacturing method for a vehicle in which a rolling bearing that comprises cylindrical rolling bodies is assembled, wherein the cylindrical rolling bodies are manufactured by the manufacturing method according to claim 1.

5. A manufacturing method for a mechanical apparatus in which a rolling bearing that comprises cylindrical rolling bodies is included, wherein the cylindrical rolling bodies are manufactured by the manufacturing method according to claim 1.

6. The manufacturing method for a cylindrical rolling body according to claim 1, wherein, in the process of plastically deforming the intermediate material, the intermediate material is compressed in a state in which outer-circumferential edge sections of both end edge sections in the axial direction of the intermediate material are respectively brought in contact with the corner R sections of the molding concave sections of the pair of molds.

* * * * *